(12) United States Patent
Kjellman

(10) Patent No.: US 11,497,950 B2
(45) Date of Patent: Nov. 15, 2022

(54) SYSTEM AND METHOD FOR DELIVERING A COOLING AGENT TO A GAS-FUELED COOKING APPLIANCE TO AID IN FIRE SUPPRESSION

(71) Applicant: Carrier Corporation, Jupiter, FL (US)

(72) Inventor: Thomas Kjellman, Uxbridge, MA (US)

(73) Assignee: Carrier Corporation, Palm Beach Gardens, FL (US)

( * ) Notice: Subject to any disclaimer, the term of this patent is extended or adjusted under 35 U.S.C. 154(b) by 44 days.

(21) Appl. No.: 16/754,346

(22) PCT Filed: Oct. 11, 2018

(86) PCT No.: PCT/US2018/055337
§ 371 (c)(1),
(2) Date: Apr. 7, 2020

(87) PCT Pub. No.: WO2019/075158
PCT Pub. Date: Apr. 18, 2019

(65) Prior Publication Data
US 2020/0306570 A1    Oct. 1, 2020

Related U.S. Application Data

(60) Provisional application No. 62/572,068, filed on Oct. 13, 2017.

(51) Int. Cl.
*A62C 3/00*       (2006.01)
*A47J 37/12*     (2006.01)
(Continued)

(52) U.S. Cl.
CPC ............. *A62C 3/006* (2013.01); *A62C 37/40* (2013.01); *A47J 37/1247* (2013.01); *A62C 2/04* (2013.01); *A62C 35/68* (2013.01); *A62C 37/44* (2013.01)

(58) Field of Classification Search
CPC ........... A62C 3/006; A62C 2/04; A62C 35/13; A62C 99/0009; A47J 37/1266
(Continued)

(56) References Cited

U.S. PATENT DOCUMENTS 3,448,808 A * 6/1969 Olson .................... A62C 3/006
                                                              169/59
3,463,233 A * 8/1969 Haessler ............. F24C 15/2021
                                                              169/59
(Continued)

FOREIGN PATENT DOCUMENTS

CA          2109558 A1       5/1995
DK    200000132 U4 *    3/2001 ............. A62C 3/065
(Continued)

OTHER PUBLICATIONS

International Search Report issued in PCT/US2018/055337, dated Jan. 17, 2019.

*Primary Examiner* — Joseph A Greenlund
(74) *Attorney, Agent, or Firm* — Locke Lord LLP; Scott D. Wofsy; Gabrielle L. Gelozin

(57) ABSTRACT

A system for delivering a cooling agent to cooking appliance to aid in fire suppression is disclosed, which includes a fuel delivery path extending from a source of cooking fuel to a heating element of the cooking appliance, a source of cooling agent selectively in fluid communication with the fuel delivery path, and a valve assembly associated with the fuel delivery path and the source of cooling agent, wherein the valve assembly is configured to control the delivery of cooling agent to the heating element of the cooking appliance and shut off the heating element from the source of cooking fuel in the event of a fire.

18 Claims, 5 Drawing Sheets

(51) Int. Cl.
*A62C 2/04* (2006.01)
*A62C 37/40* (2006.01)
A62C 35/68 (2006.01)
A62C 37/44 (2006.01)

(58) Field of Classification Search
USPC .................................. 126/391.1; 431/39, 65
See application file for complete search history.

(56) References Cited

U.S. PATENT DOCUMENTS

| | | | | |
|---|---|---|---|---|
| 3,584,688 | A * | 6/1971 | Duncan | A62C 3/006 |
| | | | | 169/59 |
| 4,751,915 | A * | 6/1988 | Price | A47J 37/1247 |
| | | | | 99/403 |
| 4,898,151 | A * | 2/1990 | Luebke | A47J 37/1247 |
| | | | | 219/400 |
| 5,249,510 | A * | 10/1993 | Rozak | A47J 37/1228 |
| | | | | 99/344 |
| 5,297,636 | A * | 3/1994 | North | A62C 3/006 |
| | | | | 169/65 |
| 5,353,880 | A * | 10/1994 | Green | A47J 37/0786 |
| | | | | 126/41 R |
| 6,186,241 | B1 * | 2/2001 | Murr | A62C 3/006 |
| | | | | 169/65 |
| 2007/0240887 | A1 * | 10/2007 | Howeth | A62C 3/006 |
| | | | | 239/548 |
| 2007/0246234 | A1 * | 10/2007 | Vegso | A62C 37/12 |
| | | | | 169/59 |
| 2008/0149354 | A1 * | 6/2008 | Biehl | A47J 27/0817 |
| | | | | 169/65 |
| 2008/0250939 | A1 * | 10/2008 | See | A62C 3/006 |
| | | | | 99/403 |
| 2011/0147017 | A1 * | 6/2011 | Saglam | A62C 3/07 |
| | | | | 169/65 |
| 2015/0136430 | A1 * | 5/2015 | Livchak | A62C 3/006 |
| | | | | 169/61 |
| 2015/0231432 | A1 * | 8/2015 | Zlatintsis | A62C 37/46 |
| | | | | 169/61 |
| 2016/0030782 | A1 * | 2/2016 | Livchak | B01D 5/0027 |
| | | | | 169/46 |
| 2017/0014657 | A1 * | 1/2017 | Rennie | A62C 3/08 |
| 2017/0144002 | A1 * | 5/2017 | Ben Neria | A62C 37/44 |
| 2017/0232284 | A1 * | 8/2017 | Farley | A62C 37/40 |
| | | | | 169/46 |
| 2019/0192892 | A1 * | 6/2019 | Johnson | A62C 35/023 |
| 2019/0390859 | A1 * | 12/2019 | Lambertson | F24C 15/20 |
| 2020/0054905 | A1 * | 2/2020 | Livchak | G08B 5/36 |
| 2020/0238112 | A1 * | 7/2020 | Kjellman | A62C 37/44 |
| 2020/0306570 | A1 * | 10/2020 | Kjellman | A62C 37/40 |
| 2021/0138286 | A1 * | 5/2021 | Bouchard | A62C 37/50 |

FOREIGN PATENT DOCUMENTS

JP 2006-212205 A 8/2006
WO 2012/163958 A2 12/2012

* cited by examiner

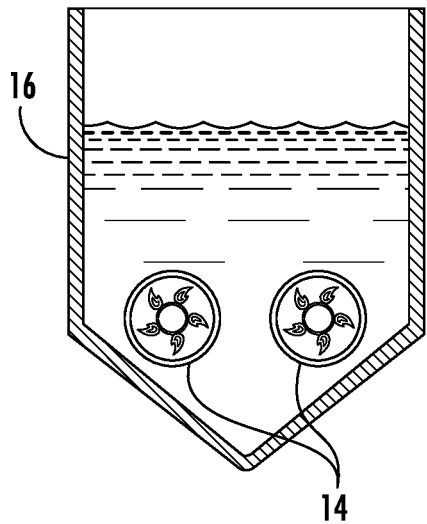
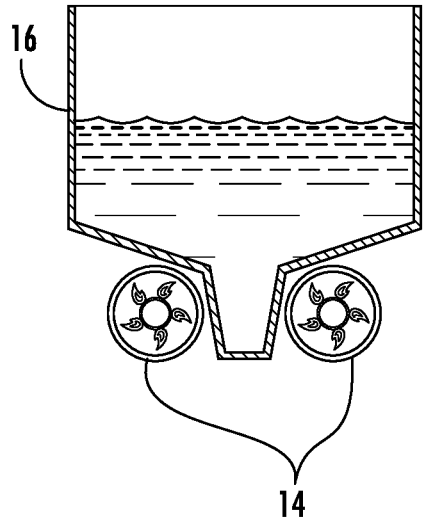
FIG. 5A  FIG. 5B
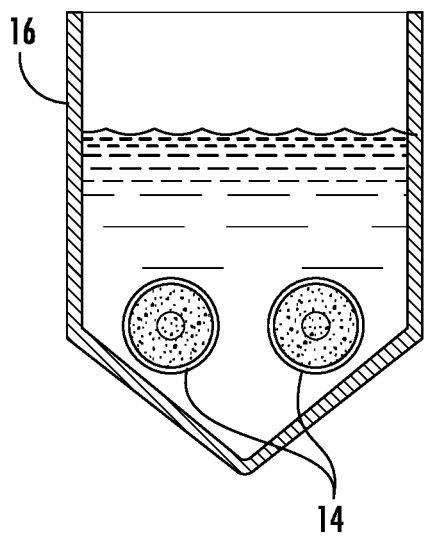
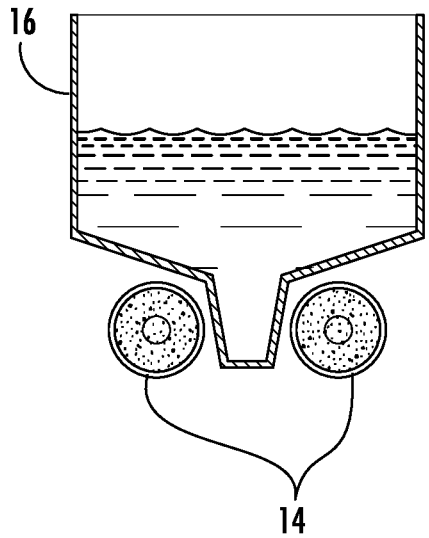
FIG. 6A  FIG. 6B

SYSTEM AND METHOD FOR DELIVERING A COOLING AGENT TO A GAS-FUELED COOKING APPLIANCE TO AID IN FIRE SUPPRESSION

CROSS-REFERENCE TO RELATED APPLICATIONS

This application is a U.S. National Phase Application filed under 35 U.S.C. § 371, based on International PCT Patent Application No. PCT/US2018/055337, filed Oct. 11, 2018, which application claims priority to U.S. Provisional Patent Application No. 62/572,068 filed on Oct. 13, 2017. The entire contents of these applications is incorporated herein by reference.

BACKGROUND OF THE INVENTION

1. Field of the Invention

The subject disclosure relates to an aid for fire suppression in commercial kitchens, and more particularly, to a system and method for delivering a cooling agent to a gas-fueled cooking appliance in the event of a fire through a dedicated fuel delivery path.

2. Description of Related Art

One of the most commonly used cooking appliances is the deep fryer, an early example of which is disclosed in U.S. Pat. No. 4,751,915. Deep fryers are used commercially by restaurants, institutional kitchens, and fast food establishments to cook a variety of food products, such as French fries, onion rings, fish, chicken and seafood. A deep fryer cooks food by totally immersing it within a tank or reservoir filled with hot oil. The oil may be heated by any suitable manner. For example, it can be heated by a gas burner. It is also possible to use a deep fryer that is electrically heated.

Deep fryers present unique safety hazards. Indeed, deep fryer oil fires are common and can cause significant damage. A fryer fire is a Class B fire since it involves oil, so water is typically not used as a suppression agent, because when the water contacts the hot oil it may cause splattering without extinguishing the flames. In addition, when hot oil splatters, it may cause a fire to spread and may also cause injury to people standing nearby. Class B fires are difficult to extinguish because of the low auto-ignition points of deep fryer oil. In addition to the low ignition temperature, the oil reservoir in the deep fryer contains a large amount of oil which acts as a fuel supply to feed the fire for a substantial period of time. The longer the fire is active, the greater the risk that it will spread.

Consequently, it is important to extinguish a fryer oil fire rapidly. In addition, even if the fire is extinguished quickly, there is a secondary fire hazard which can occur due to "re-flash" (i.e., the re-ignition of the fire, because the oil remains above the ignition temperature after the flames have been extinguished) which can occur at lower temperatures.

Attempts to extinguish Class B fires have resulted in the development of many different fire extinguishing compositions and fire extinguishing systems which are designed to extinguish the oil fire while the oil remains in the deep fryer. While these prior art extinguishing systems may be effective in putting out the fire, they can take a substantial amount of time, which may result in substantial property damage or injury to individuals. In addition, re-flash or auto-ignition of the hot oil remains a serious problem. Therefore, it would be beneficial to provide a system and method for cooling the oil in the fryer to prevent re-ignition after the initial fire has been extinguished and thereby aid in fire suppression.

Typically, the operation of a fire suppression system associated with a deep fryer involves the discharge of a fire suppressant through dedicated suppressant piping, coordinated with the shut-off of the fuel line used to supply the burner of the appliance. It is also often the case that suppression systems for deep fryers require fire suppressant to be sprayed directly onto the fryer oil, mixing the suppression agent with the oil, and forming an insulating layer above the oil that can slow cooling. Once cooking oil is mixed with fire suppressant the oil cannot be used in cooking.

SUMMARY OF THE DISCLOSURE

The subject invention is directed to a new and useful system for delivering a cooling agent to a cooking appliance to aid in fire suppression. The system includes a fuel delivery path extending from a source of cooking fuel to a heating element of the cooking appliance, a source of cooling agent selectively in fluid communication with the fuel delivery path, and a valve assembly operatively associated with the fuel delivery path and the source of cooling agent. The valve assembly is configured to control the delivery of cooling agent to the heating element of the cooking appliance and shut off the heating element from the source of cooking fuel in the event of a fire.

The valve assembly has a first position permitting fluid communication between the source of cooking fuel and the heating element through the fuel delivery path, while preventing fluid communication between the source of cooling agent and the heating element through the fuel delivery path. The valve assembly has a second position that prevents fluid communication between the source of cooking fuel and the heating element through the fuel delivery path, while permitting fluid communication between the source of cooling agent and the heating element through the fuel delivery path.

The system further includes an actuation mechanism connected to the valve assembly for facilitating the movement of the valve assembly from the first position to the second position. In one embodiment of the invention, the actuation mechanism is mechanically actuated by a fusible link of the like. In another embodiment of the invention, the actuation mechanism is electrically actuated by a solenoid switching mechanism or the like. Preferably, the actuation mechanism is operatively associated with a condition sensing device, such as, for example, a smoke detector or a heat sensor. The condition sensor will activate or otherwise trigger the actuation mechanism upon detecting excess heat, smoke or another sensed condition beyond a certain allowable level or limit. In the alternative, an override switch or pull station could be operatively associated with the actuation mechanism, in addition to or instead of the condition sensor, to manually activate the coolant delivery system.

It is envisioned that the system disclosed herein could be configured to provide cooling service to plural cooking appliances located within a kitchen that are all operatively associated with a valve assembly connected to the fuel delivery path of each appliance and a cooling agent. It is also envisioned that plural sources of cooling agent could be arranged in a bank that is in fluid communication with the valve assembly through a manifold.

The subject invention is also directed to a system for delivering cooling agent to a gas-fueled cooking appliance to aid in fire suppression, which includes a fuel delivery path extending from a source of cooking fuel to a burner of the cooking appliance, a source of cooling agent selectively in fluid communication with the fuel delivery path, and a valve assembly operatively associated with the fuel delivery path and the source of cooling agent, wherein the valve assembly has: a first position permitting fluid communication between the source of cooking fuel and the burner through the fuel delivery path, while preventing fluid communication between the source of cooling agent and the burner through the fuel delivery path; and a second position preventing fluid communication between the source of cooking fuel and the burner through the fuel delivery path, while permitting fluid communication between the source of cooling agent and the burner through the fuel delivery path in the event of a fire.

The subject invention is also directed to a method of delivering a cooling agent to a gas-fueled deep fryer to aid in fire-suppression, which includes the steps of connecting a source of cooling agent to a fuel delivery path extending from a source of cooking fuel to a heating element of the deep fryer, and facilitating the delivery of cooling agent to the heating element of the deep fryer as cooking fuel to the heating element is shut off from a source of cooking fuel.

The step of facilitating the delivery of cooling agent can involve facilitating the actuation of a valve assembly operatively associated with the fuel delivery path and the source of cooling agent. In one embodiment of the invention, the step of facilitating actuation of the valve assembly involves facilitating the mechanical actuation of the valve assembly. In another embodiment of the invention, the step of facilitating actuation of the valve assembly involves facilitating the electrical actuation of the valve assembly. Alternatively, in the event of a fire, the valve assembly could be manually activated from a pull station or the like.

These and other features of the system of the subject invention and the manner in which it is manufactured, assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the system of the subject invention without undue experimentation, preferred embodiments thereof will be described in detail herein below with reference to the figures wherein:

FIGS. 5A and 5B illustrate two different cooking appliance configurations in a heating mode, wherein one appliance has heating elements with burners that are located within the cooking volume and the other has heating elements with burners that are physically separated from the cooking volume; and FIGS. 6A and 6B illustrate the cooking appliances shown in FIGS. 5A and 5B in a cooling mode, wherein a cooling agent is delivered to the burners of the appliance to cool the oil located in the reservoir.

DETAILED DESCRIPTION OF THE PREFERRED EMBODIMENTS

It would be more beneficial to use the burner of a gas-fired deep fryer as a nozzle for delivering a cooling agent into an area adjacent the cooking volume to aid in fire suppression. As the fuel to the burner is shut off from its supply, cooling agent would be allowed to flow into the dedicated gas delivery piping, without requiring an additional piping for coolant delivery. Moreover, since the oil reservoir volume and the burner occupy separate adjacent volumes, no cooling agent would be delivered into the cooking volume, preventing contamination of the cooking oil and/or forming an insulating layer which would delay cooling.

Figure 1:
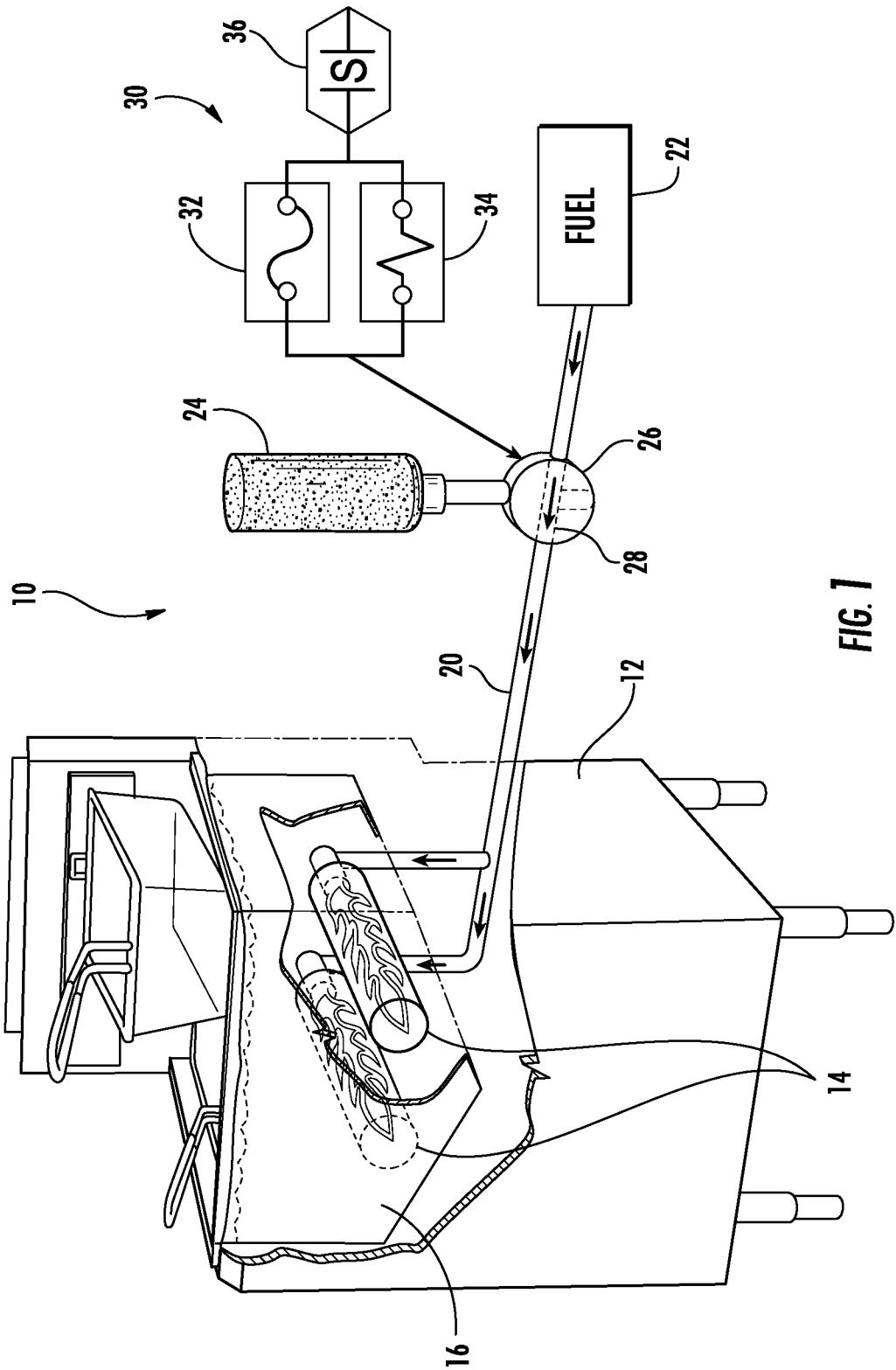
FIG. 1 is an illustration of a system for delivering a cooling agent to a gas-fueled cooking appliance in the event of a fire, which includes a valve assembly operatively associated with the fuel delivery path of the appliance and a source of cooling agent, wherein the valve assembly is shown in a position that permits fluid communication between the source of cooking fuel and the appliance through the fuel delivery path, while preventing fluid communication between the source of cooling agent and the appliance.

Referring now to the drawings wherein like reference numerals identify similar structural elements or features of the subject invention, there is illustrated in FIG. 1 a system 10 for delivering a cooling agent to a cooking appliance, and more particularly, to a gas-fueled cooking appliance, such as a deep oil fryer, designated generally by reference numeral 12. It is envisioned that the delivery system 10 of the subject invention would be integrated with or otherwise housed within the cooking appliance itself, rather than being located separate or otherwise remote from the cooking appliance. The location of the coolant delivery system 10, either within or attached to the housing of the cooking appliance 12, would vary depending upon the overall structural design of the appliance.

As discussed in more detail below, the coolant delivery system 10 of the subject invention uses the heating elements or burners 14 that are located within the cooking volume or oil reservoir 16 of the cooking appliance 12 as spray nozzles for the delivery of a cooling agent. As fuel to the burner 14 is shut off from the supply of fuel 22, the cooling agent is allowed to flow into the fuel delivery piping 20, which carries the cooling agent directly into the heating element 14 within the cooking volume 16 of the appliance 12, without requiring any additional piping to be installed.

Those skilled in the art will readily appreciate that this design simplifies the installation of the fire suppression system by eliminating the need for dedicated suppressant piping that may be associated with the cooking appliance, as is typical in fire suppression systems found in most commercial kitchens. Therefore, system installation costs are reduced, kitchen staff has less piping in their workspace, and dedicated suppressant piping need not be rearranged when or if the appliance is moved. Additionally, because the system is integrated within and can otherwise move with the cooking appliance itself, it would not be possible to leave the appliance unprotected if it is moved away from any suppression agent delivery piping and spray nozzles.

With reference to FIG. 1, the coolant delivery system 10 includes a dedicated fuel delivery path 20 that extends from a source of cooking fuel 22 to the heating element(s) or burner(s) 14 of the cooking appliance 12, which are located within the oil reservoir 16. The source of cooking fuel can be a self-contained storage vessel (as depicted) or cooking fuel could be supplied from a remote source by a main distribution line leading into the kitchen. The cooking fuel could be propane or natural gas depending upon availability and/or cost.

A source of cooling agent in the form of a self-contained pressure vessel 24 or the like is in fluid communication with the dedicated fuel delivery path 20 of the fryer 12. Those skilled in the art will readily appreciate that the cooling agent can be selected from materials such as compressed air, a liquid cooling agent or the like. The pressure vessel 24 could also include a propellant for facilitating the transport of the cooling agent through the duel delivery path 20 in the event of a fire. Those skilled in the art will readily appreciate that a relatively small amount of propellant would be required in this system, due to the proximity of the cooling agent source 24 and the cooking volume 16 being protected.

In accordance with a preferred embodiment of the subject invention, a valve assembly 26 is operatively associated with the dedicated fuel delivery path 20 and the source of cooling agent 24. The valve assembly 26 includes a two-way rotatable valve element 28 that is adapted and configured to control the delivery of a cooling agent to the burner 14 of the cooking appliance 12, as cooking fuel to the burner 14 is shut off from the source of cooking fuel 22 in the event of a fire. Those skilled in the art will readily appreciate that valve assembly 26 will have appropriate internal sealing features associated with the rotating valve element 28 to prevent cross-talk between the internal flow paths and otherwise maintain the fluid integrity of the valve assembly 26.

Figure 2:
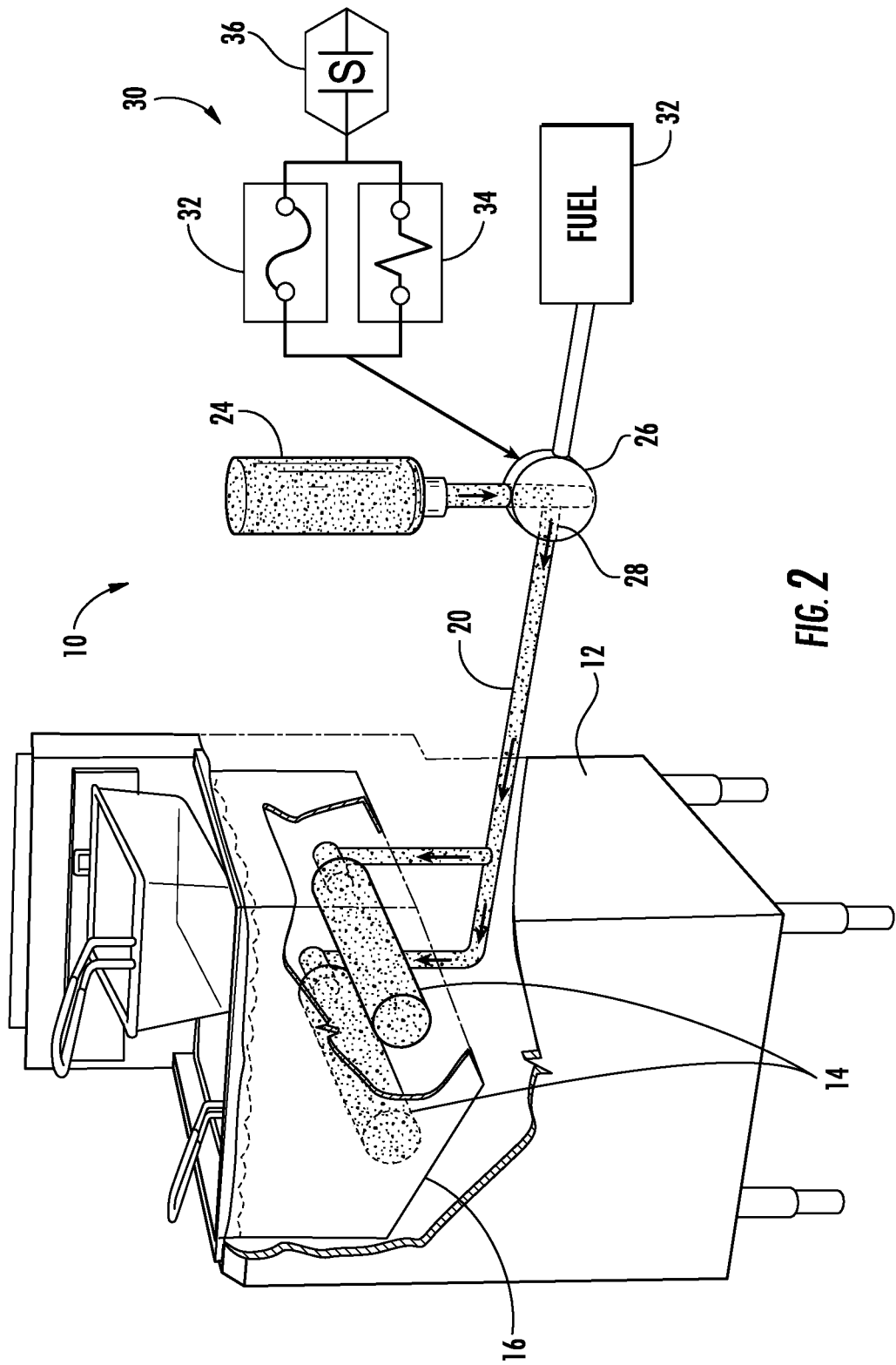
FIG. 2 is an illustration of the system shown in FIG. 1, wherein the valve assembly is in a position to prevent fluid communication between the source of cooking fuel and the cooking appliance, while permitting fluid communication between the source of cooling agent and the heating element through the fuel delivery path of the appliance.

The rotatable valve element 28 of valve assembly 26 has a first operating position that permits fluid communication between the source of cooking fuel 22 and the burner 14 of the cooking appliance 12 through the fuel delivery path 20, while preventing fluid communication between the source of cooling agent 24 and the burner 14 through the fuel delivery path 20, which is depicted in FIG. 1. The rotatable valve element 28 of valve assembly 26 has a second operating position (rotated in a clockwise direction from the first position as shown in the depicted exemplary embodiment) that prevents fluid communication between the source of cooking fuel 22 and the burner 14 through the fuel delivery path 20, while permitting fluid communication between the source of cooling agent and the burner 14 through the fuel delivery path 20, which is depicted in FIG. 2. When valve element 28 is in its second position, the burner 14 of cooking appliance 12 functions as a spray nozzle to deliver the cooling agent directly into the heating element enclosure, without requiring the installation of any additional piping for coolant delivery.

The coolant delivery system 10 further includes an actuation mechanism 30 connected to valve assembly 26 to facilitate the movement of valve element 28 from the first position of FIG. 1 to the second position of FIG. 2 in the event of a fire within the oil reservoir 16 of the cooking appliance 12. In one embodiment of the invention, the actuation mechanism 30 is mechanically actuated by way of a fusible link 32 or the like. In another embodiment of the invention, the actuation mechanism 30 is electrically actuated by way of a solenoid switching mechanism 34 or the like. In an embodiment of the subject invention, the actuation mechanism 30 is also operatively associated with a cooking volume condition sensor 36, such as, for example, a heat sensor, a smoke detector or a similar condition sensing device capable of monitoring the operating environment of the cooking appliance 12.

The condition sensor 36 will activate or otherwise trigger the actuation mechanism 30 upon detecting excess heat, smoke or another sensed condition beyond a certain allowable level or limit. In the alternative, a manual override switch will be operatively associated with the actuation mechanism 30, in addition to or instead of the condition sensor 36. The manual override feature would be in the form of a pull station or the like, where the cook or kitchen staff could pull a pin or press a button in the event of a fire to activate the coolant delivery system 10 as the kitchen is evacuated.

Figure 3:
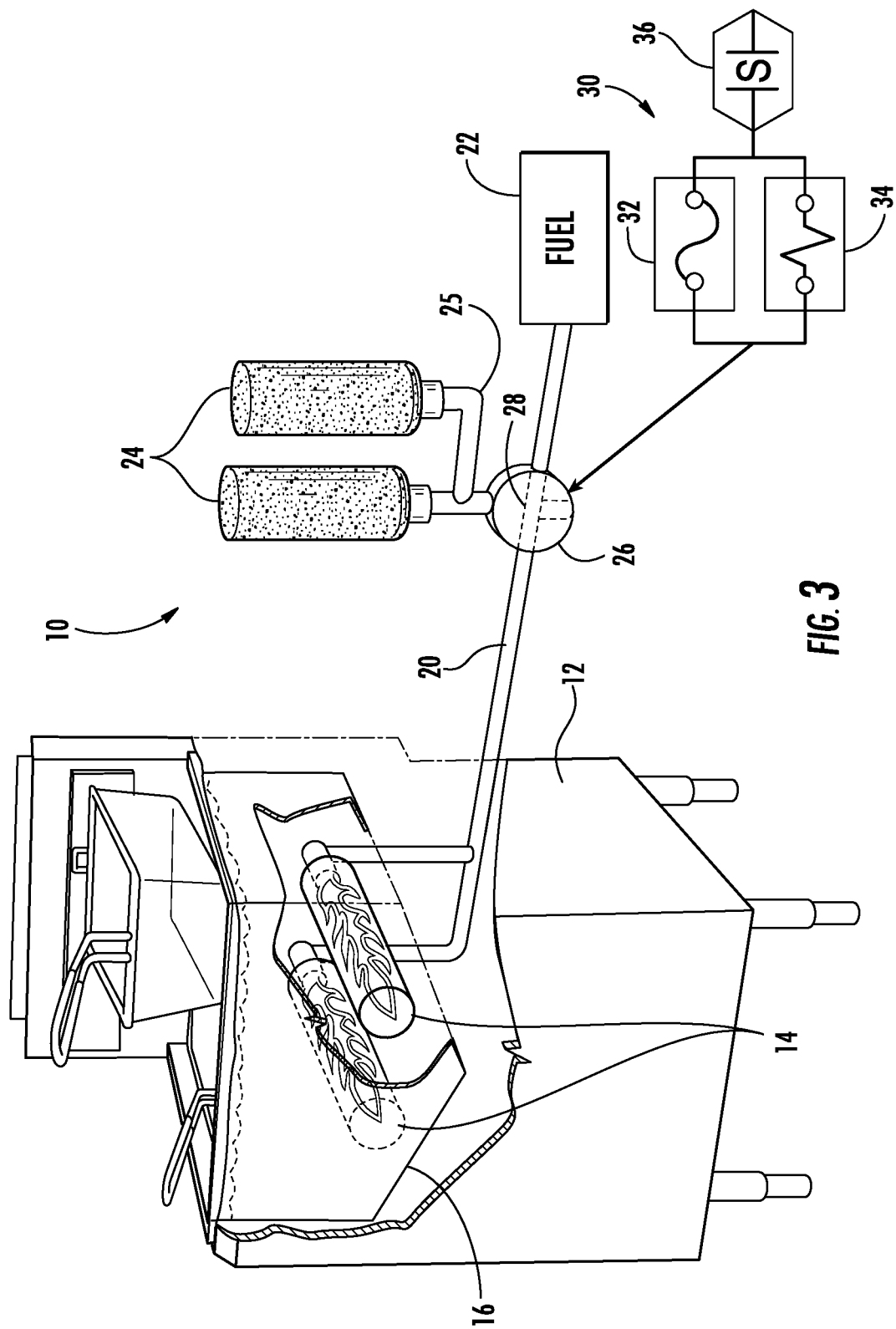
FIG. 3 is an illustration of a system for delivering a cooling agent to a gas-fueled cooking appliance in the event of a fire, which includes plural source of cooling agent in fluid communication a valve assembly operatively associated with the fuel delivery path of the cooking appliance, wherein the valve assembly is in a position that permits fluid communication between a source of cooking fuel and the appliance through the fuel delivery path, while preventing fluid communication between the source of cooling agent and the appliance.
Figure 4:
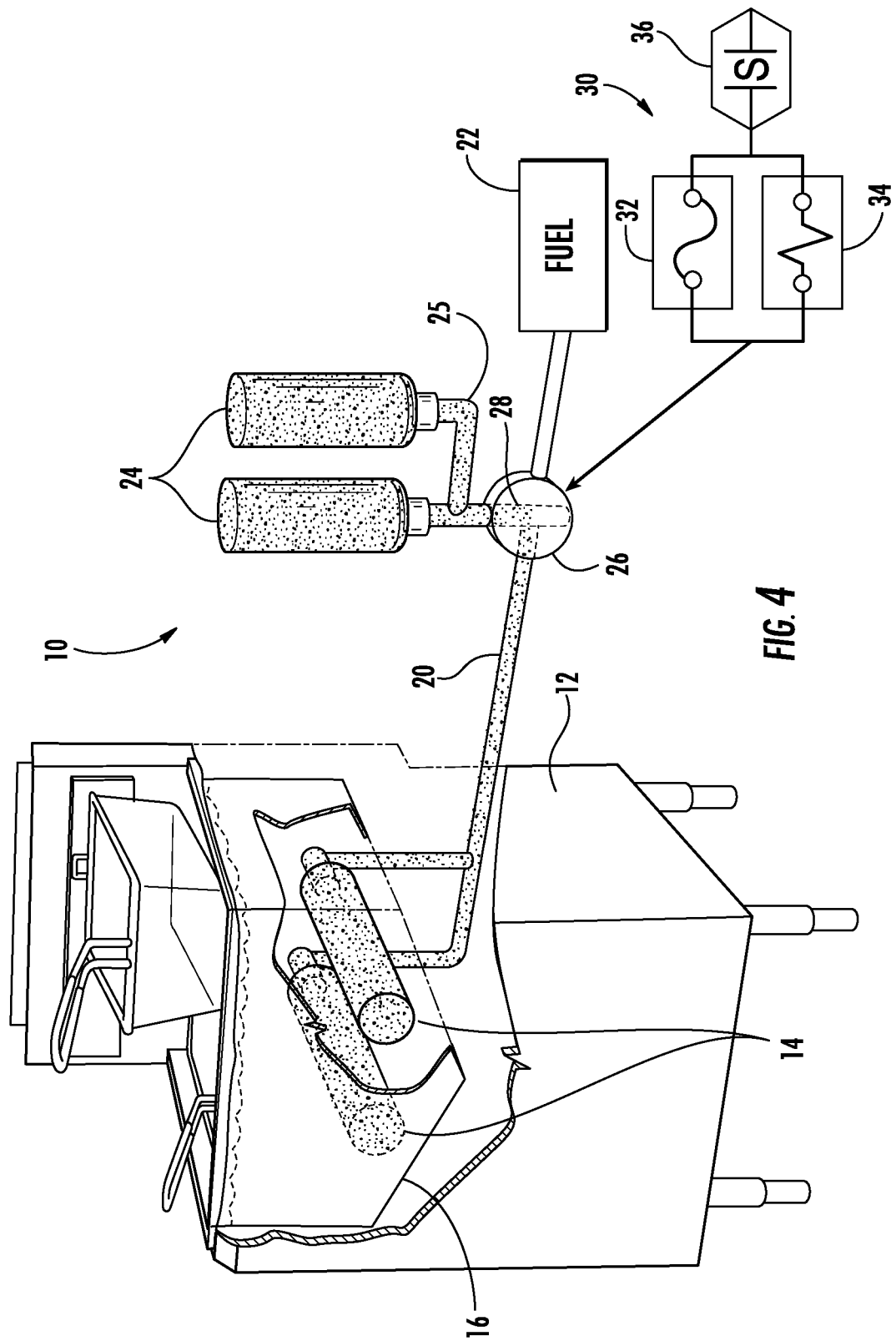
FIG. 4 is an illustration of the system shown in FIG. 3, wherein the valve assembly is in a position that permits fluid communication between the plural sources of cooling agent and the fuel delivery path of the appliance.

Referring now to FIGS. 3 and 4, in another embodiment of the subject invention, the coolant delivery system 10 would include plural sources of cooling agent that are all in fluid communication with the valve assembly 26, such as a bank 24 of storage vessels that are connected to a manifold 25, which communicates with the valve assembly 26. It is envisioned that the manifold 25 could be configured to deliver the cooling agent from each of the supply vessels of bank 24 in concert or in series.

Referring to FIGS. 5A and 5B, there is illustrated two different cooking appliance configurations in a heating mode, wherein one appliance has heating elements with burners 14 that are located within the oil reservoir 16 and the other has heating elements with burners 14 that are physically separated from the oil reservoir 16. FIGS. 6A and 6B illustrate the cooking appliances shown in FIGS. 5A and 5B in a cooling mode, wherein a cooling agent is delivered to the burners 14 of the appliances to cool the oil located in the reservoirs 16.

Referring once again to FIGS. 1 and 2, the subject invention is also directed to a method of delivering a cooling agent to a gas-fueled oil fryer 12, which includes the steps of connecting a source of cooling agent 24 to a dedicated fuel delivery path 20 extending from a source of cooking fuel 22 to a burner 14 of the fryer 12, and facilitating the delivery of cooling agent to the burner 14 of the fryer 12 as cooking fuel to the burner 14 is shut off from a source of cooking fuel in the event of a fire, so that the burner 14 functions as a direct spray nozzle for delivering the cooling agent into the heating element casing that occupies a volume adjacent the oil reservoir 16.

The step of facilitating the delivery of cooling agent involves facilitating the actuation of a valve assembly 26 operatively associated with the fuel delivery path 20 and the source of cooling agent 24. In one embodiment of the invention, the step of facilitating actuation of the valve assembly 26 involves facilitating the mechanical actuation of the valve assembly 26. In another embodiment of the invention, the step of facilitating actuation of the valve assembly 24 involves facilitating the electrical actuation of the valve assembly 26.

This method promotes cooling of the cooking oil without adding any coolant or suppression agent into the oil itself, so that the oil will remain suitable for use in cooking. Prior technology has required the cooking oil to be discarded before cooking can resume. It is envisioned that with the system of the subject invention it would be possible for the cooking oil to be cooled while cooking is ongoing, even preemptively upon detection of a high temperature risk by the condition sensor 36. Additionally, because the cooling agent does not enter the oil reservoir 16, this method of cooling does not produce an insulating layer of cooling agent on top of the oil, which can extend cooling time. This cooling method could be used in combination with another fire suppression method to reduce the amount of suppression agent that is needed to suppress the fire, as the additional cooling could help prevent reigniting once the fire is extinguished by the suppression agent. While the subject disclosure has been shown and described with reference to certain preferred embodiments of the invention, those skilled in the art will readily appreciate that changes and/or modifications may be made thereto without departing from the scope of the subject disclosure.

What is claimed is:

1. A system for cooling a cooking appliance to aid in fire suppression, comprising:
    a fuel delivery path extending from a source of cooking fuel to a heating element of the cooking appliance;
    a source of cooling agent selectively in fluid communication with the fuel delivery path; and
    a valve assembly operatively associated with the fuel delivery path and the source of cooling agent, wherein the valve assembly is configured to control the delivery of a fuel and cooling agent to the heating element of the cooking appliance and configured to control shut off of the heating element from the source of cooking fuel in the event of a fire, wherein the cooking appliance includes a cooking volume containing cooking oil therein and the heating element is located within or below the cooking volume of the cooking appliance, wherein the heating element is configured to retain the cooling agent within the heating element when the cooling agent is delivered to the heating element such that no cooling agent is added to the cooking oil.

2. The system of claim 1, wherein the valve assembly has a position permitting fluid communication between the source of cooking fuel and the heating element through the fuel delivery path, while preventing fluid communication between the source of cooling agent and the heating element through the fuel delivery path.

3. The system of claim 1, wherein the valve assembly has a position preventing fluid communication between the source of cooking fuel and the heating element through the fuel delivery path, while permitting fluid communication between the source of cooling agent and the heating element through the fuel delivery path.

4. The system of claim 1, further comprising an actuation mechanism connected to the valve assembly for facilitating movement of the valve assembly from a first positon to a second position.

5. The system of claim 4, wherein the actuation mechanism is mechanically actuated.

6. The system of claim 4, wherein the actuation mechanism is electrically actuated.

7. The system of claim 4, wherein the actuation mechanism is operatively associated with a condition sensor.

8. The system of claim 1, wherein the cooking appliance is a deep fryer.

9. The system of claim 8, wherein plural sources of fire suppression agent are in fluid communication with the valve assembly.

10. A system for cooling a gas-fueled cooking appliance to aid in fire suppression, comprising:
    a fuel delivery path extending from a source of cooking fuel to a burner of the cooking appliance, wherein the cooking appliance includes a cooking volume containing cooking oil therein and the heating element is located within or below the cooking volume of the cooking appliance;
    a source of cooling agent selectively in fluid communication with the fuel delivery path, wherein the heating element is configured to retain the cooling agent within the heating element when the cooling agent is delivered to the heating element such that no cooling agent is added to the cooking oil; and
    a valve assembly operatively associated with the fuel delivery path and the source of cooling agent configured to control the delivery of a fuel and cooling agent to the heating element of the cooking appliance and configured to control shut off of the heating-element from the source of cooking fuel in the event of a fire, the valve assembly having:
        a first position permitting fluid communication between the source of cooking fuel and the burner through the fuel delivery path, while preventing fluid communication between the source of cooling agent and the burner through the fuel delivery path; and
        a second position preventing fluid communication between the source of cooking fuel and the burner through the fuel delivery path, while permitting fluid communication between the source of cooling agent and the burner through the fuel delivery path in the event of a fire.

11. The system of claim 10, wherein the cooking appliance is a deep fryer.

12. The system of claim 10, further comprising an actuation mechanism connected to the valve assembly for facilitating movement of the valve assembly from the first position to the second position.

13. The system of claim 12, wherein the actuation mechanism is mechanically actuated.

14. The system of claim 12, wherein the actuation mechanism is electrically actuated.

15. The system of claim 12, wherein the actuation mechanism is operatively associated with a condition sensor.

16. A method of cooling a gas-fueled deep fryer having a cooking volume containing cooking oil therein to aid in fire-suppression, comprising:
    connecting a source of cooling agent to a fuel delivery path extending from a source of cooking fuel to a heating element of the deep fryer; and
    controlling with a valve assembly the delivery of cooling agent to the heating element of the deep fryer; and
    controlling with the valve assembly to shut off a cooking fuel from a source of cooking fuel to the heating element, wherein the heating element is configured to retain the cooling agent within the heating element when the cooling agent is delivered to the heating element such that no cooling agent is added to the cooking oil.

17. The method of claim 16, wherein the step of facilitating the actuation of a valve assembly involves facilitating the mechanical actuation of the valve assembly.

18. The method of claim 16, wherein the step of facilitating the actuation of a valve assembly involves facilitating the electrical actuation of the valve assembly.

* * * * *